United States Patent
Seok et al.

(10) Patent No.: US 8,237,908 B2
(45) Date of Patent: Aug. 7, 2012

(54) METHOD OF MANUFACTURING LIQUID CRYSTAL DISPLAY

(75) Inventors: Min-Goo Seok, Yongin-si (KR); Jae-Jin Lyu, Yongin-si (KR); Seung-Beom Park, Seoul (KR); Jong-Ho Son, Seoul (KR); Ji-Won Sohn, Seoul (KR); Myeong-Ha Kye, Seoul (KR); Hoon Kim, Ansan-si (KR); Jun-Hee Na, Asan-si (KR)

(73) Assignee: Samsung Electronics Co., Ltd. (KR)

( * ) Notice: Subject to any disclaimer, the term of this patent is extended or adjusted under 35 U.S.C. 154(b) by 773 days.

(21) Appl. No.: 12/260,518

(22) Filed: Oct. 29, 2008

(65) Prior Publication Data

US 2009/0270007 A1   Oct. 29, 2009

(30) Foreign Application Priority Data

Apr. 23, 2008   (KR) .................. 10-2008-0037778

(51) Int. Cl.
 *G02F 1/1337*   (2006.01)
 *G02F 1/13*   (2006.01)
 *G02F 1/141*   (2006.01)
 *G02F 1/1339*   (2006.01)

(52) U.S. Cl. ......... 349/191; 349/187; 349/134; 349/190

(58) Field of Classification Search .................. None
See application file for complete search history.

(56) References Cited

U.S. PATENT DOCUMENTS

2003/0063249 A1 *   4/2003   Hoshino et al. ............... 349/149
2005/0162576 A1   7/2005   Sasaki et al.
2006/0001818 A1   1/2006   Hsu
2007/0019144 A1 *   1/2007   Nakanishi et al. ............ 349/139

FOREIGN PATENT DOCUMENTS

| JP | 07181453 | | 7/1995 |
|----|----------|---|--------|
| JP | 08101395 | A * | 4/1996 |
| JP | 11287978 | | 10/1999 |
| JP | 2001183640 | | 7/2001 |
| JP | 2002098977 | | 4/2002 |
| JP | 2002131760 | | 5/2002 |
| KR | 100321257 | | 1/2002 |
| KR | 100617025 | | 8/2006 |
| KR | 1020070070403 | | 7/2007 |

OTHER PUBLICATIONS

Machine translation of JP08-101395A; Apr. 16, 1996.*
Machine translation of JP2002-131760A; Sep. 5, 2002.*

* cited by examiner

*Primary Examiner* — Wen-Ying P Chen
(74) *Attorney, Agent, or Firm* — Cantor Colburn LLP

(57) ABSTRACT

A method of manufacturing a liquid crystal display includes; forming a mother substrate assembly by disposing a liquid crystal mixture layer having liquid crystals and a light curable alignment supplement between a first mother substrate and a second mother substrate of a liquid crystal display, and disposing a light curable sealant surrounding the liquid crystal mixture layer, pre-tilting liquid crystal molecules of the liquid crystal mixture layer by applying a voltage to the first mother substrate and the second mother substrate, and simultaneously hardening the alignment supplement and the sealant by radiating light to the mother substrate assembly while applying the voltage to the first mother substrate and the second mother substrate.

22 Claims, 19 Drawing Sheets

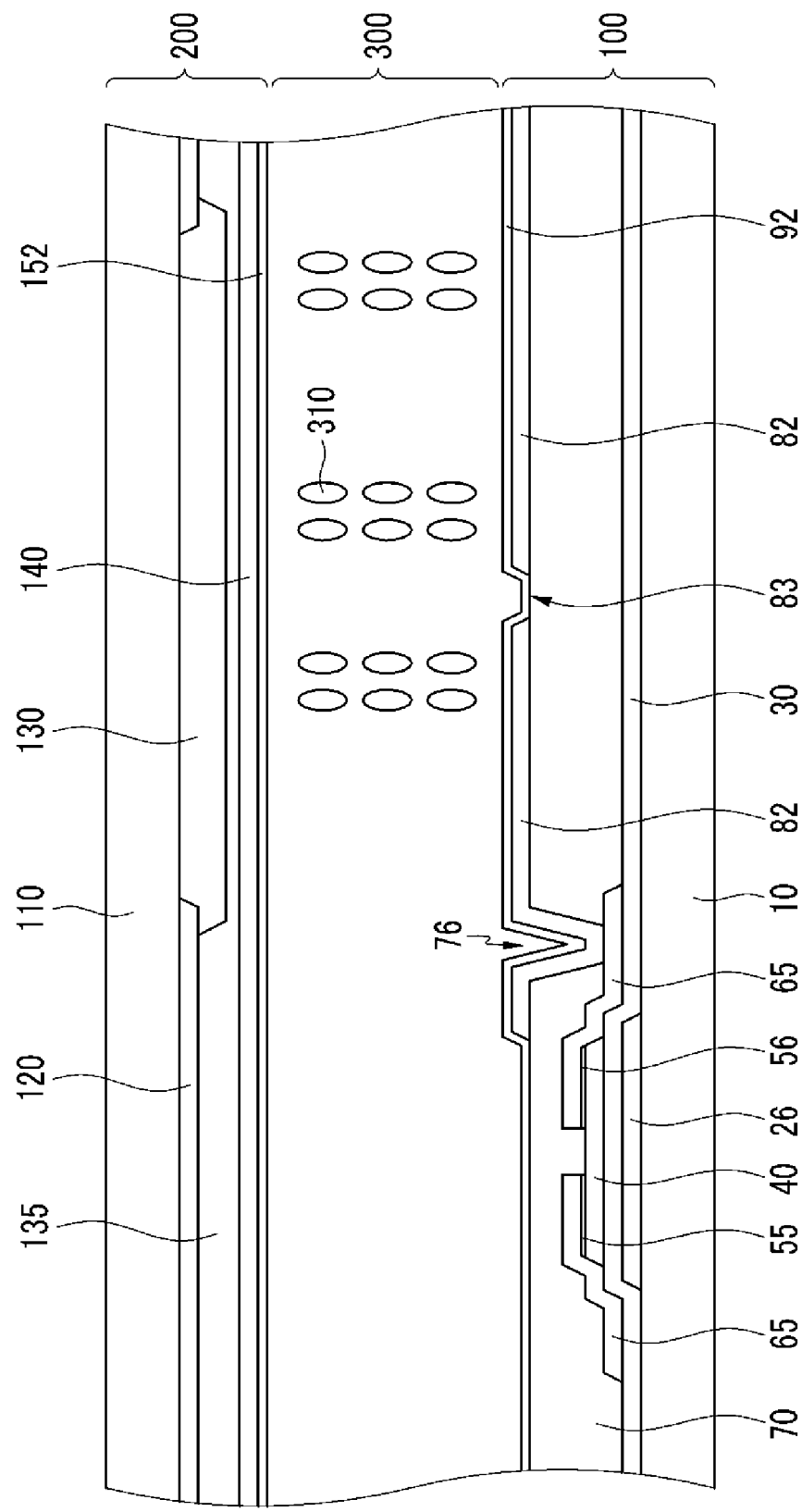

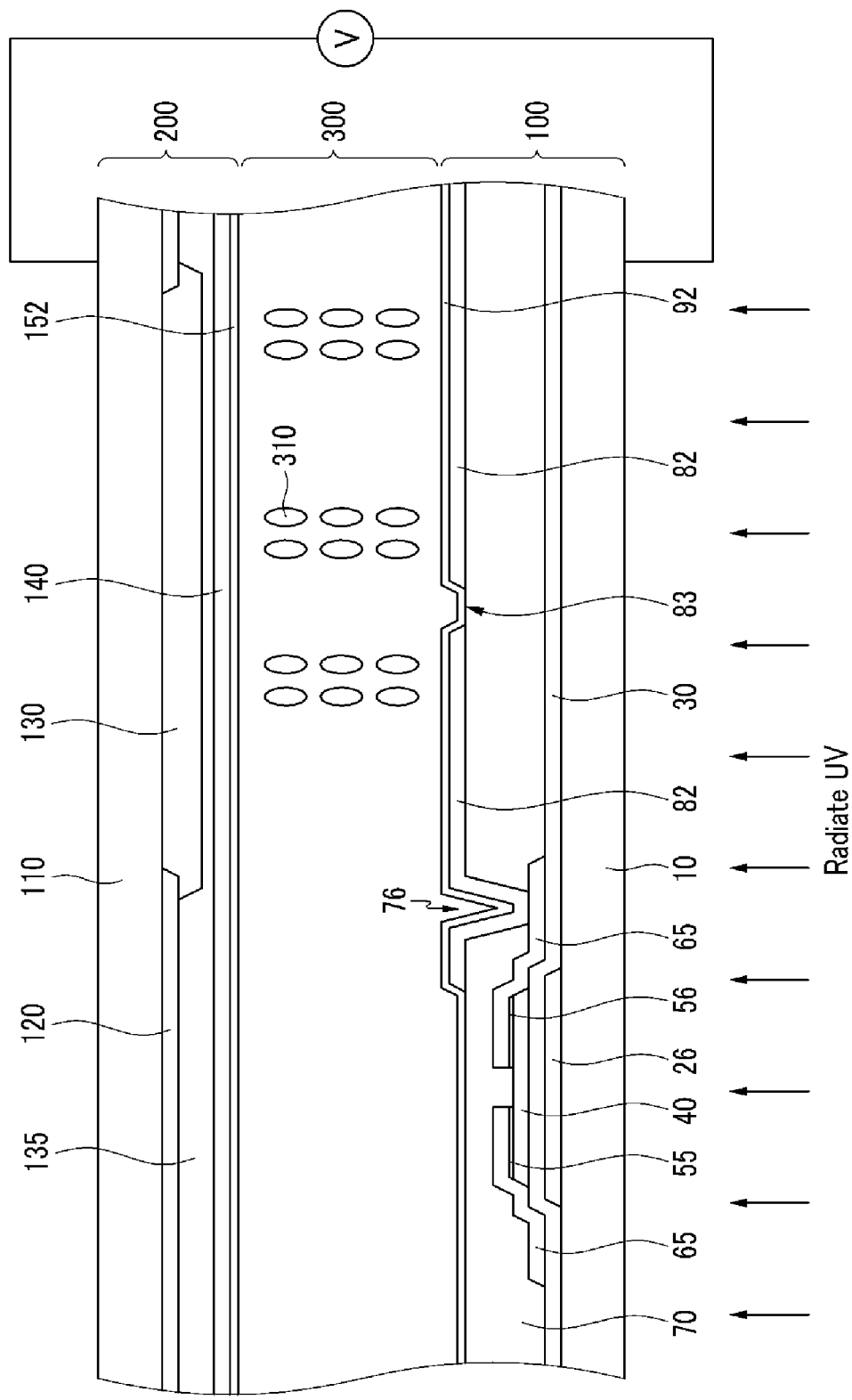

METHOD OF MANUFACTURING LIQUID CRYSTAL DISPLAY

This application claims priority to Korean Patent Application No. 10-2008-0037778, filed on Apr. 23, 2008, and all the benefits accruing therefrom under 35 U.S.C. §119, the contents of which are herein incorporated by reference.

BACKGROUND OF THE INVENTION (a) Field of the Invention

The present invention relates to a method for manufacturing a liquid crystal display.

(b) Description of the Related Art

Liquid crystal displays ("LCDs"), one of the most popular flat panel displays, include a first display panel, a second display panel, and a liquid crystal layer interposed between the first and second display panels. The LCD displays images by generating an electric field at the liquid crystal layer, determining the alignment of liquid crystals of the liquid crystal layer through the generated electric field, and controlling the polarization of incident light thereby.

In a vertical alignment ("VA") mode LCD, a longitudinal axis of liquid crystal is aligned vertically to upper and lower substrates in the absence of an applied electric field. Since the VA mode LCD has a great contrast ratio and a wide reference viewing angle, the VA mode LCD has been receiving increased attention. In order to embody a wide viewing angle in the VA mode LCD, a domain-forming member is formed in a field generating electrode. For example, the domain-forming member may be an aperture or a protrusion on the field generating electrode.

As examples, LCDs having a domain-forming member include a VA mode liquid crystal display having domain-forming members formed at both of the upper and lower substrates, and a patternless VA mode liquid crystal display having miniature patterns formed only at a lower substrate without forming patterns on an upper substrate. A display area is sectored into a plurality of domains by the domain-forming members, and liquid crystals in each domain are inclined in the same direction.

Lately, a technology for pre-tilting liquid crystals at a predetermined angle has been introduced in order to improve response speed. For example, liquid crystals are disposed between first and second display panels, an alignment supplement is added between the first and second display panels to pre-tilt the liquid crystals at a predetermined angle, and the alignment supplement is hardened.

In a process of hardening the alignment supplement and liquid crystals are aligned by applying a voltage in the liquid crystal display, and the alignment supplement among the aligned liquid crystals is hardened with a predetermined pre-tilt angle at a surface of the alignment material.

BRIEF SUMMARY OF THE INVENTION

The present invention relates a method for manufacturing a liquid crystal display. More particularly, the present invention relates to a method for manufacturing a liquid crystal display for reducing afterimages and improving response speed of a liquid crystal.

The present invention provides a method for manufacturing a liquid crystal display in order to reduce overall manufacturing processes by simultaneously hardening an alignment supplement and a sealant for sealing upper and lower substrates of each liquid crystal panel.

The technical objects of the present invention are not limited by the above-described technical objects, and other technical objects not described above may be clearly understood by a person of ordinary skill in the art based on the following description.

An exemplary embodiment of the present invention provides a method of manufacturing a liquid crystal display including; forming a mother substrate assembly by disposing a liquid crystal mixture layer having liquid crystals and a light curable alignment supplement between a first mother substrate and a second mother substrate of a liquid crystal display, and disposing a light curable sealant surrounding the liquid crystal mixture, pretilting liquid crystal molecules of the liquid crystal mixture layer by applying a voltage to the first mother substrate and the second mother substrate, and simultaneously hardening the alignment supplement and the sealant by radiating light to the mother substrate assembly while applying the voltage to the first mother substrate and the second mother substrate.

Details of other exemplary embodiments are included in detailed description and drawings.

As described above, overall manufacturing processes can be reduced and a manufacturing time can be shortened by simultaneously hardening a monomer for pre-tilt and a sealant through radiating ultraviolet rays.

BRIEF DESCRIPTION OF THE DRAWINGS

FIGS. 3-6 are cross-sectional views illustrating an exemplary embodiment of a method for manufacturing an LCD according to the present invention.

DETAILED DESCRIPTION OF THE INVENTION

Figure 1:
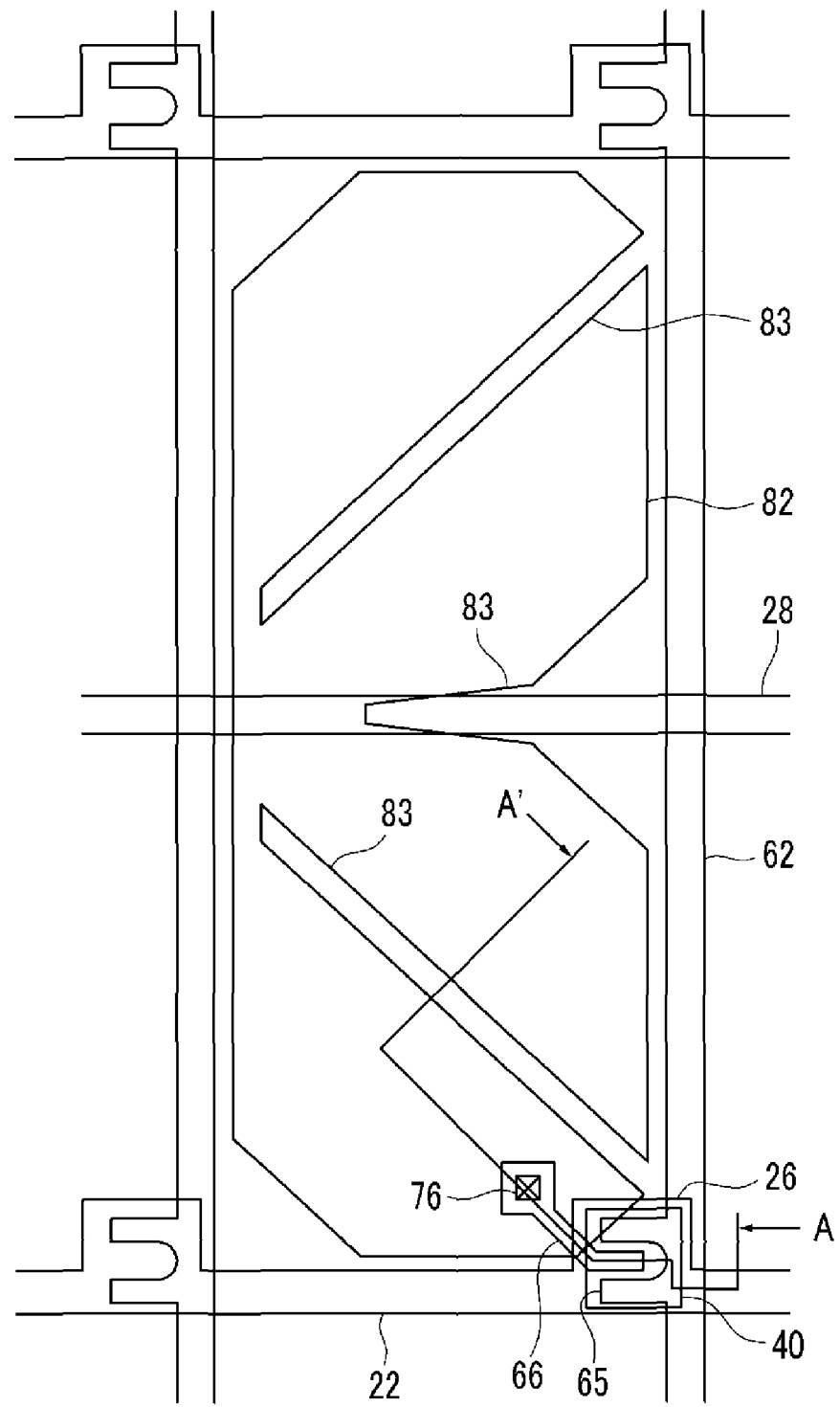
FIG. 1 is a top plan layout view of an exemplary embodiment of a liquid crystal display ("LCD") manufactured by an exemplary embodiment of a method for manufacturing an LCD in accordance with the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, an exemplary embodiment of an exemplary embodiment of a method for manufacturing an exemplary embodiment of a liquid crystal display ("LCD") in accordance with the present invention will be described with reference to FIG. 1 to FIG. 10 and FIG. 17 to FIG. 19.

Figure 2:
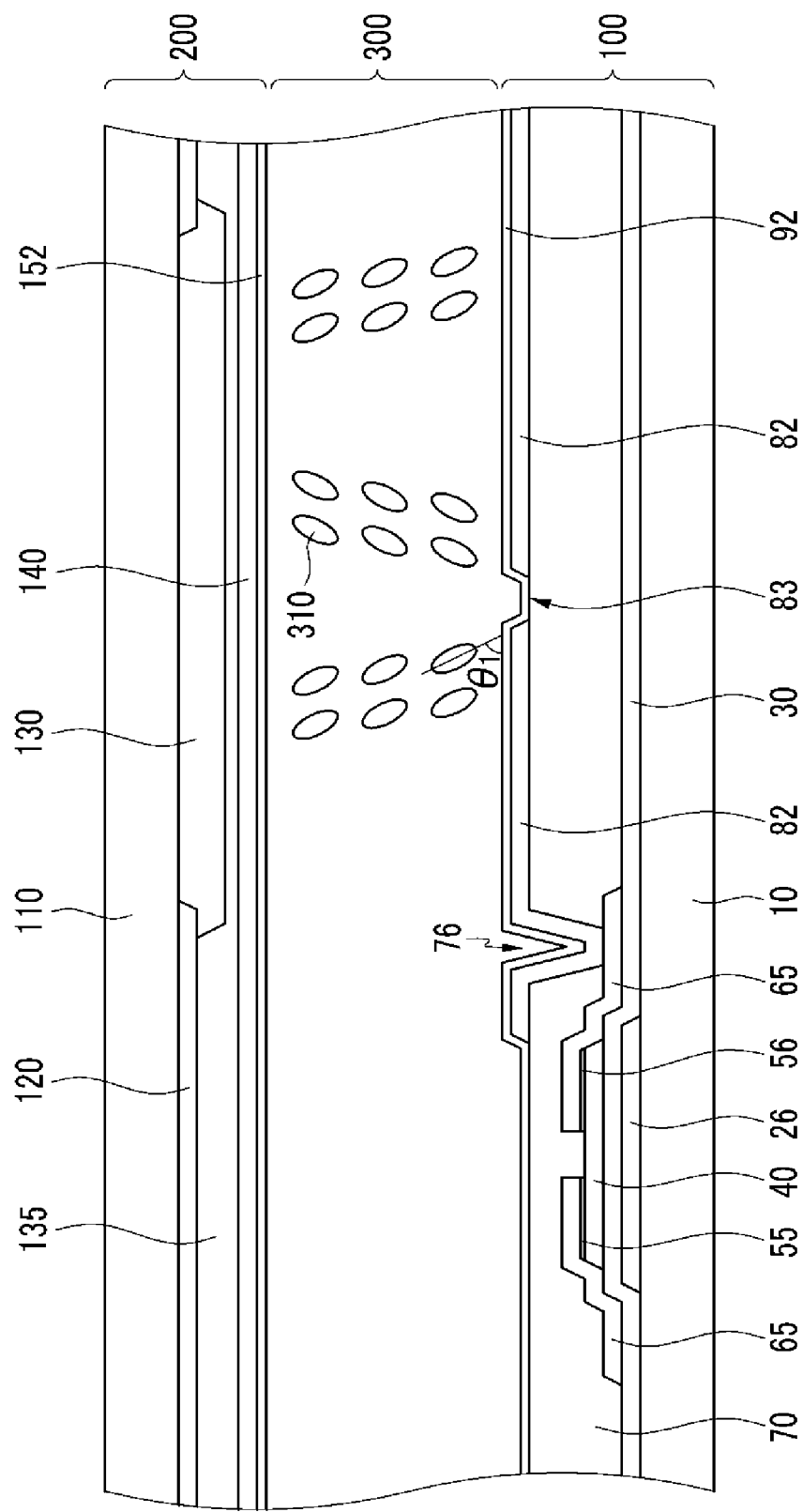
FIG. 2 is a cross-sectional view of an LCD of FIG. 1 taken along line A-A'.
Figure 8:
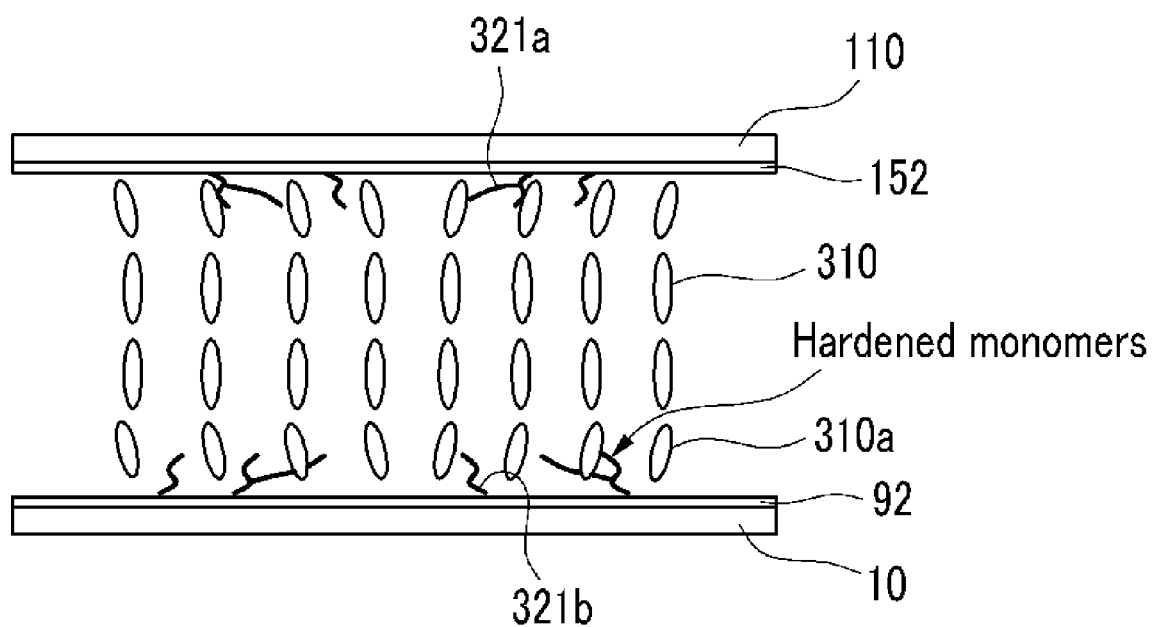
FIG. 8 is a cross-sectional view illustrating monomers that are hardened after step b) of FIG. 7 and liquid crystal molecules without a voltage being applied.
Figure 9:
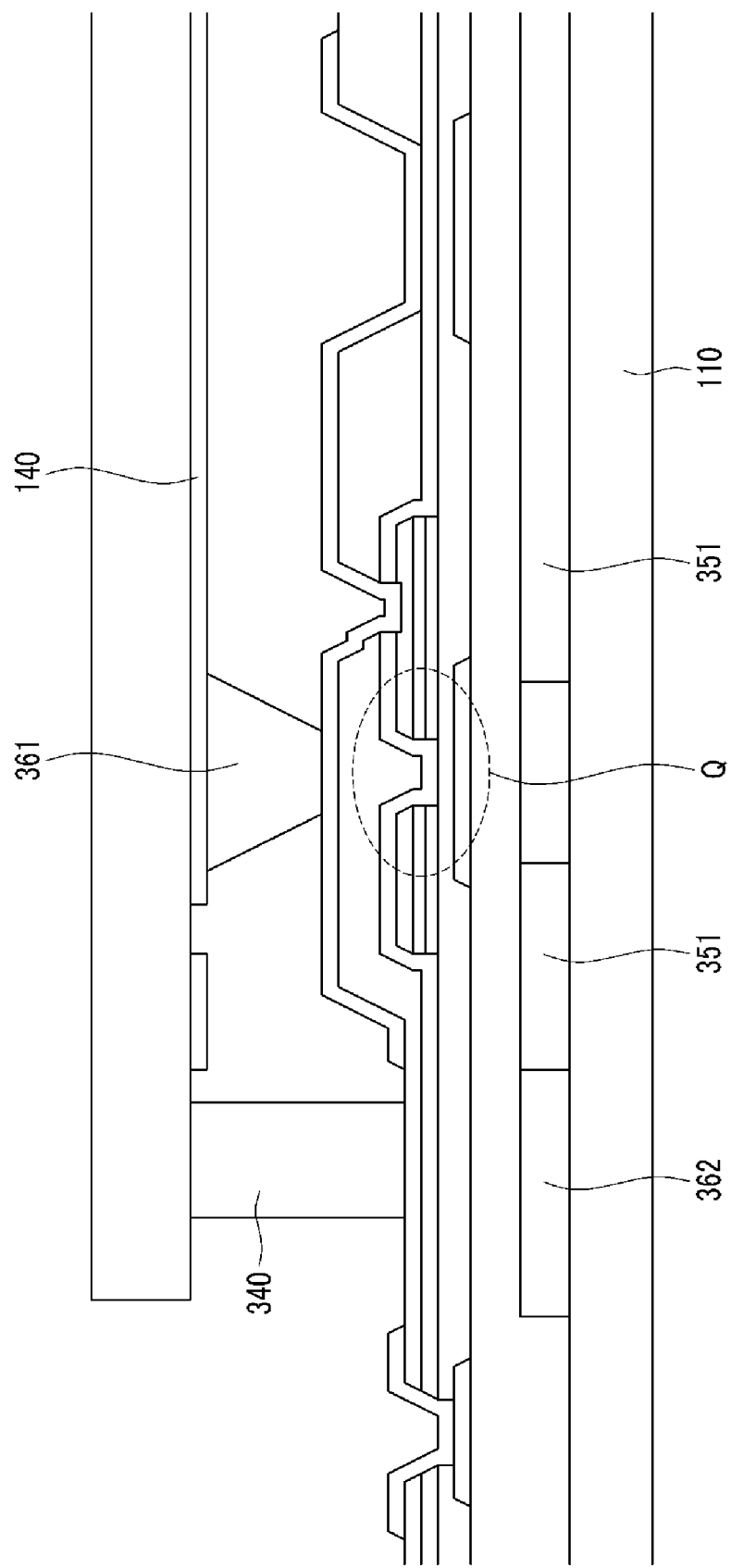
FIG. 9 and FIG. 10 are cross-sectional views of an exemplary embodiment of an LCD having a color filter and a black matrix disposed on a first substrate in a manufacturing process of the LCD of FIG. 1.
Figure 10:
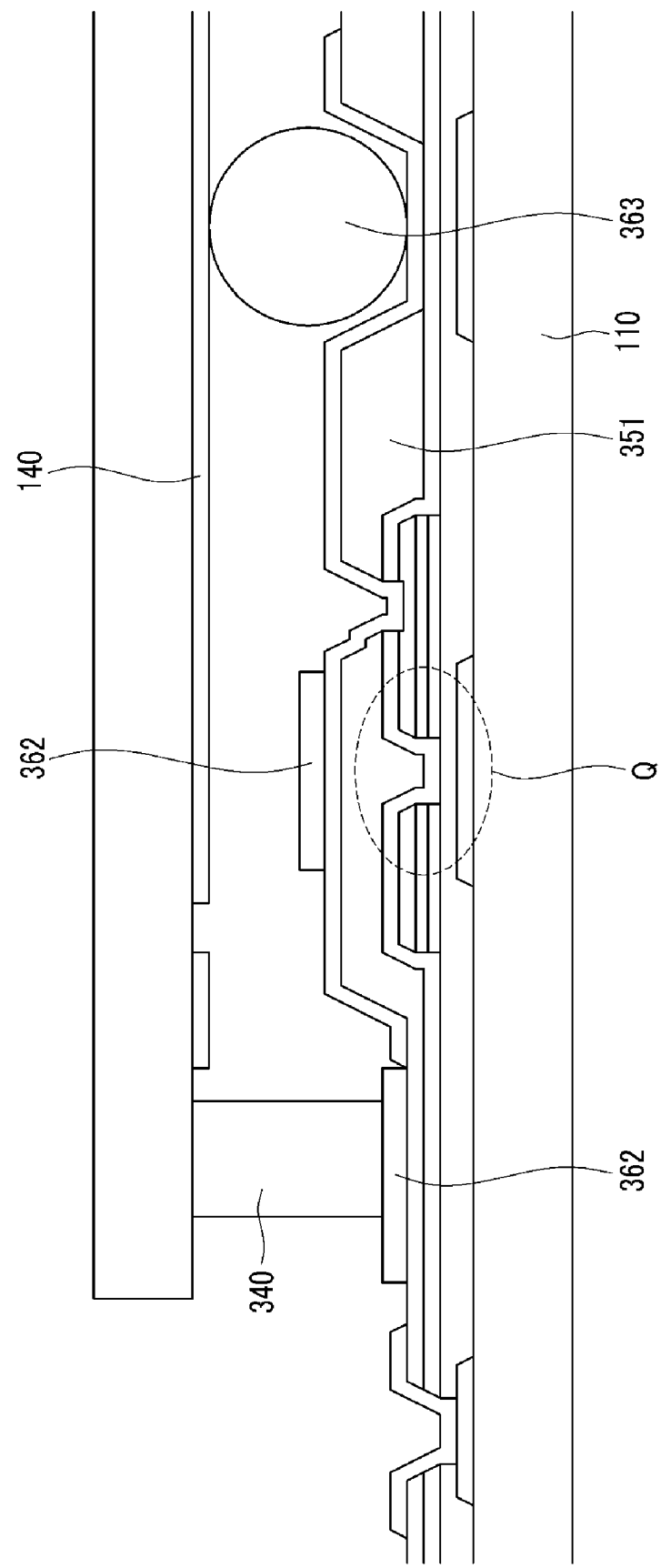
Figure 17:
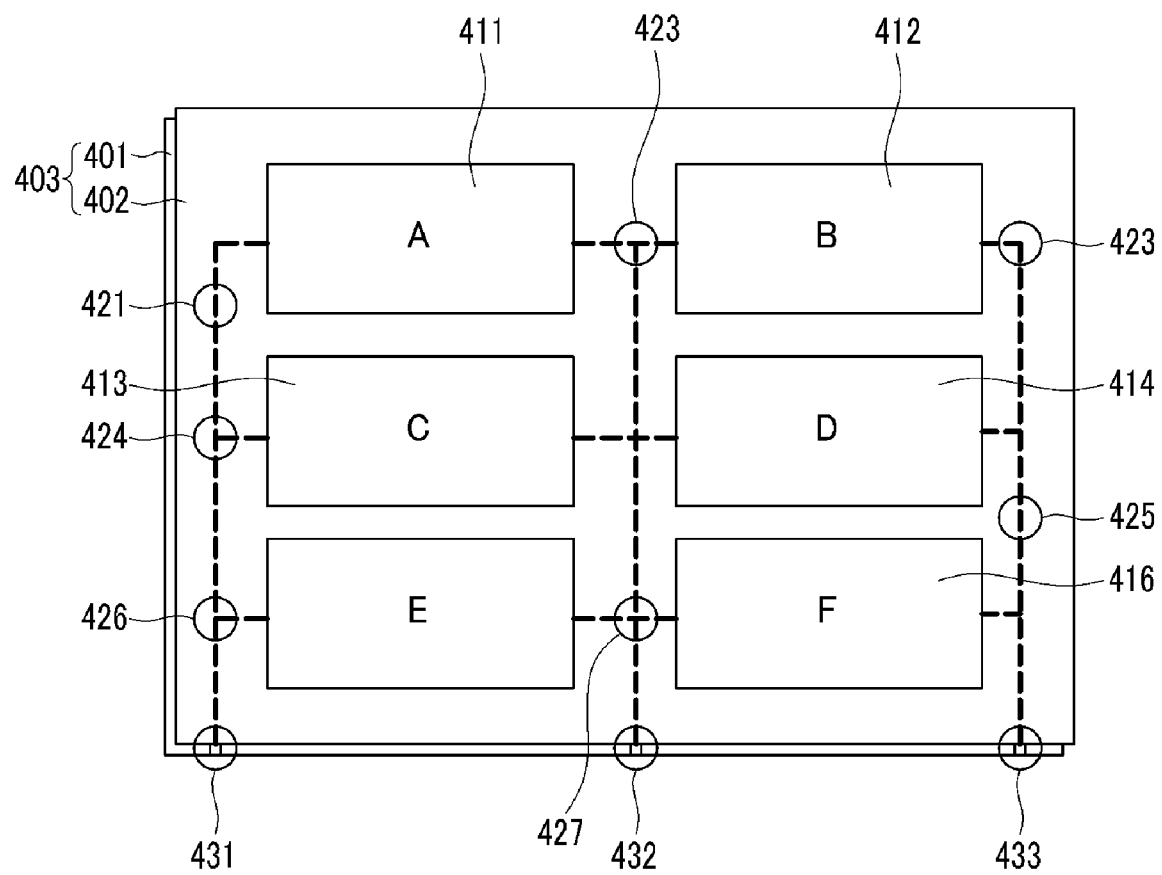
FIG. 17 is a schematic diagram illustrating the exemplary embodiment of an LCD of FIG. 1 or FIG. 11 having a plurality of mother substrate assemblies.
Figure 18:
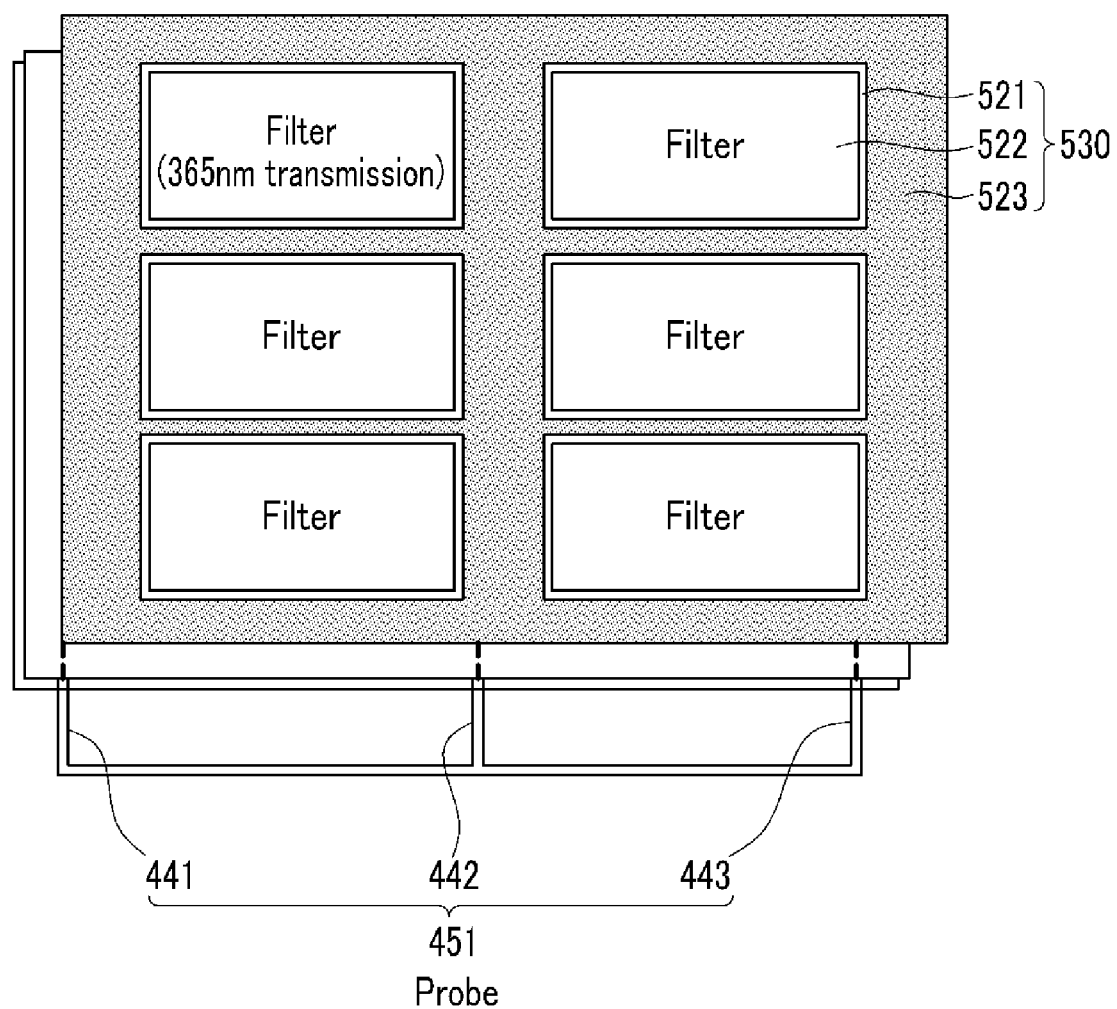
FIG. 18 is a schematic diagram illustrating a probe and an ultraviolet mask arranged at the mother substrate assembly of FIG. 17.
Figure 19:
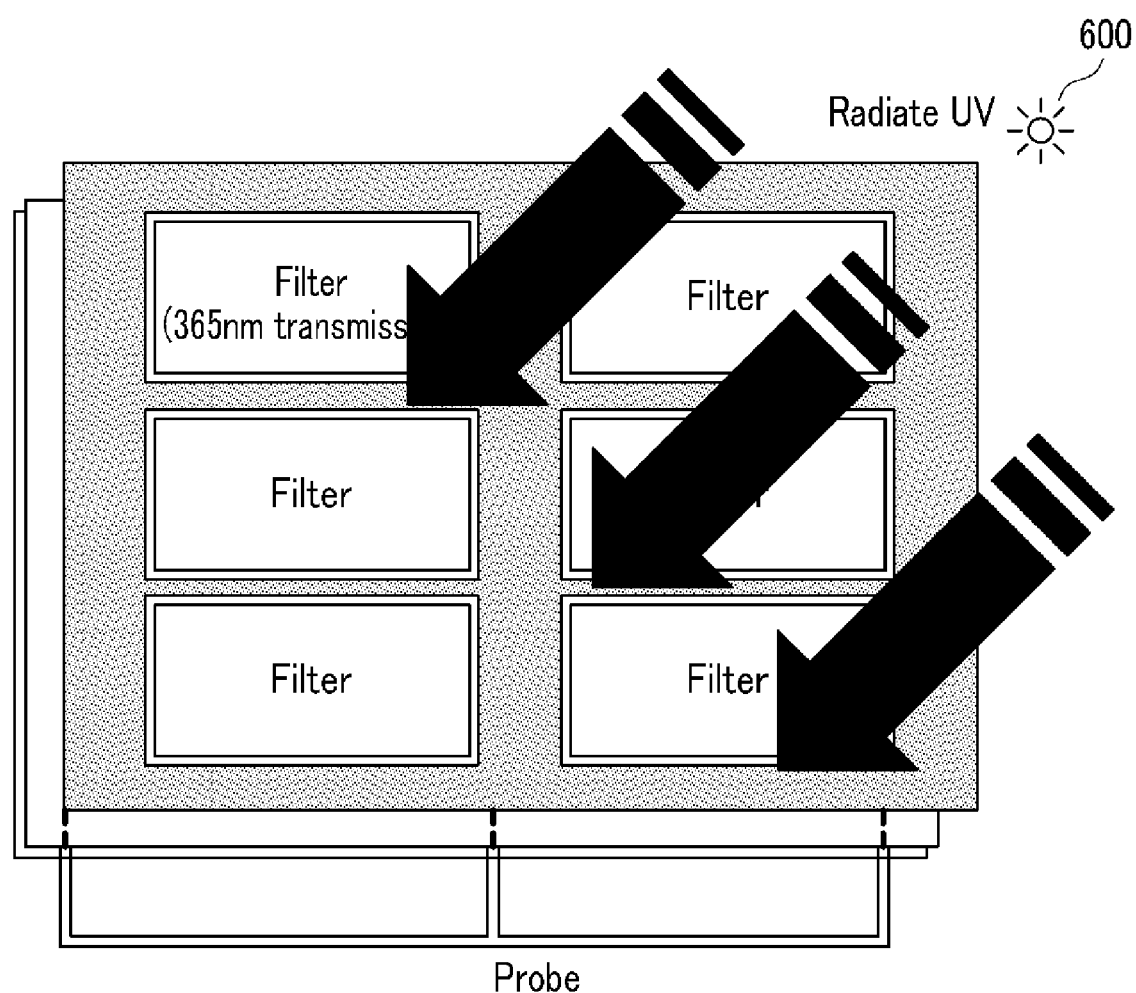
FIG. 19 is a schematic diagram illustrating the mother substrate assembly of FIG. 18 with ultraviolet rays being applied thereto.

FIG. 1 is a top plan layout view of an exemplary embodiment of an LCD manufactured by an exemplary embodiment of a method for manufacturing an LCD in accordance with the present invention, FIG. 2 is a cross-sectional view of the exemplary embodiment of an LCD of FIG. 1 taken along line A-A', FIGS. 3-6 are cross-sectional views illustrating an exemplary embodiment of a method for manufacturing an exemplary embodiment of an LCD according to the present invention, and FIG. 7 is a cross-sectional view illustrating monomers of FIG. 6 and movements of liquid crystal molecules according to an applied voltage. FIG. 8 is a cross-sectional view illustrating monomers that are hardened after step b) of FIG. 7 and liquid crystal molecules without a voltage being applied, and FIG. 9 and FIG. 10 are cross-sectional views of the exemplary embodiment of an LCD having a color filter and a black matrix disposed on a first substrate in a manufacturing process of the LCD of FIG. 1. FIG. 17 is a schematic diagram illustrating an LCD of FIG. 1 or FIG. 11 having a plurality of mother substrate assemblies. FIG. 18 is a schematic diagram illustrating a probe and an ultraviolet mask arranged at the mother substrate assembly of FIG. 17. FIG. 19 is a schematic diagram illustrating the mother substrate assembly of FIG. 18 with ultraviolet rays being applied thereto.

As shown in FIG. 1 and FIG. 2, the exemplary embodiment of an LCD according to the present invention includes a first display panel 100, a second display panel 200 and a liquid crystal mixture layer 300 interposed between the first and second display panels 100 and 200.

Figure 3:
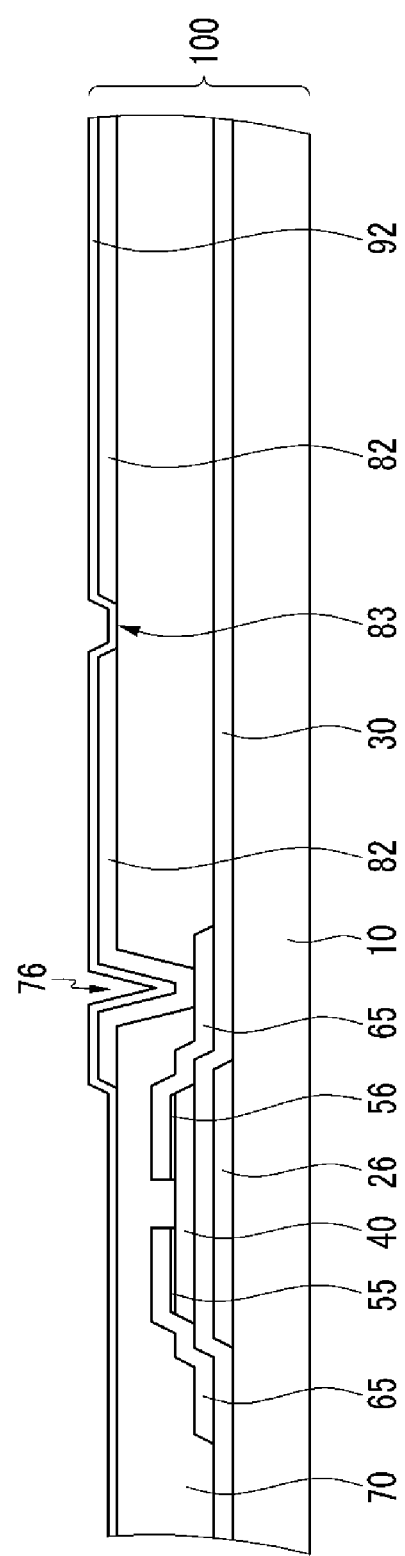

As shown in FIG. 3, the first display panel 100 including a plurality of elements such as a pixel electrode 82 having a domain-forming member 83 is prepared for manufacturing such an LCD. In particular, a metal layer for forming a gate wiring is stacked on an insulation substrate 10. In one exemplary embodiment, the gate wiring may be formed through sputtering. The gate wiring includes a gate line 22, a gate electrode 26 and a storage electrode 28, and is formed by patterning the metal layer.

Then, a gate insulating layer 30, exemplary embodiments of which are made of silicon nitride $SiN_x$, is formed on the gate wiring. In one exemplary embodiment the gate insulating layer 130 is formed through plasma enhanced chemical vapor deposition ("PCVD").

Hydrogenated amorphous silicon, polysilicon, an n+ hydrogenated amorphous silicon semiconductor layer 40 with an n-type impurity doped at a high concentration, and a conductive layer for forming a data wiring are sequentially deposited on the gate insulating layer 30. In one exemplary embodiment the amorphous silicon, polysilicon, n+ hydrogenated amorphous silicon semiconductor layer 40, and data wiring are formed through sputtering. Then, a semiconductor layer 40, ohmic contact layers 55 and 56, a data line 62, a source electrode 65 and a drain electrode 66 are formed by etching the result through photolithography.

Then, a passivation layer 70 is formed on the result. In one exemplary embodiment the passivation layer may be formed through reactivity chemical vapor deposition. A contact hole 76 is formed to expose a predetermined part of the drain electrode 66.

Subsequently, a conductive material is formed on the passivation layer 70. In one exemplary embodiment the conductive material may be formed through sputtering, and a pixel electrode 82 having the domain-forming member 83 is formed by patterning the conductive material. The pixel electrode 82 may be made of a transparent conductor exemplary embodiments of which include indium tin oxide ("ITO") and indium zinc oxide ("IZO"), and the pixel electrode 82 may be made of an opaque conductor, exemplary embodiments of which include aluminum. Here, the domain-forming member 83 may be an aperture in the pixel electrode 82 or a protrusion (not shown). Hereinafter, the pixel electrode 82 will be described to have an aperture as the domain-forming member 83 in further detail. However, the present invention is not limited thereto.

As shown in FIG. 1, the pixel electrode 82 is divided into a plurality of domain regions by apertures 83 formed in an incision pattern. Here, the apertures 83 include a horizontal member which extends to a horizontal midpoint of the pixel electrode 82, and oblique line members which extend in an oblique direction at an upper part and a lower part of the pixel electrode 82. Here, the oblique line member of the upper part is substantially perpendicular to the oblique line member of the lower part in order to uniformly distribute a horizontal electric field in four directions. Each of the oblique line members includes a part that substantially forms an angle of about 45° from the gate line 22 when seen from a top plan view, and another part that substantially forms an angle of about −45° from the gate line 22 when send from a top plan view. The upper and lower apertures 83 may have a mirror symmetry about the storage electrode 28 which divides the pixel area into two substantially equal upper and lower parts. In one exemplary embodiment, the oblique line member of the aperture 83 may be formed in the upper part of the pixel electrode 82 to substantially form an angle of about 45° from the gate line 22 from a top plan view perspective and another oblique line member of the aperture 83 may be formed in the lower part of the pixel electrode 82 to substantially form an angle of about −45° from the gate line 22 from a top plan view perspective, as shown in FIG. 1. However, the present invention is not limited thereto. The shape and arrangement of the oblique line members of the apertures 83 may be changed within a range that allows the oblique line member of the aperture 83 to substantially form about 45° or about −45° from the gate line 22.

Using the aperture 83 of the pixel electrode 82, the display area of the pixel electrode 82 is divided into a plurality of domains according to alignment directions of the liquid crystal molecules 310 included in a liquid crystal mixture layer 300 when an electric field is applied to liquid crystal molecules 310. Here, the domain denotes a region formed of liquid crystals, where liquid crystal molecules 310 are grouped and inclined in a predetermined direction by an electric field formed between the pixel electrode 82 and a common electrode 140.

Then, a first vertical alignment layer 92 is formed on the pixel electrode 82. In one exemplary embodiment, the first vertical alignment layer 92 may be formed through printing. The first vertical alignment layer 92 vertically aligns the liquid crystal molecules 310 with a second vertical alignment layer 152. The second vertical alignment layer 152 will be described later.

Meanwhile, a color filter 351 and a light blocking member 362 may be formed at a lower part or a upper part of a thin film transistor Q in the first display panel 100, as shown in FIG. 9 and FIG. 10.

Figure 4:
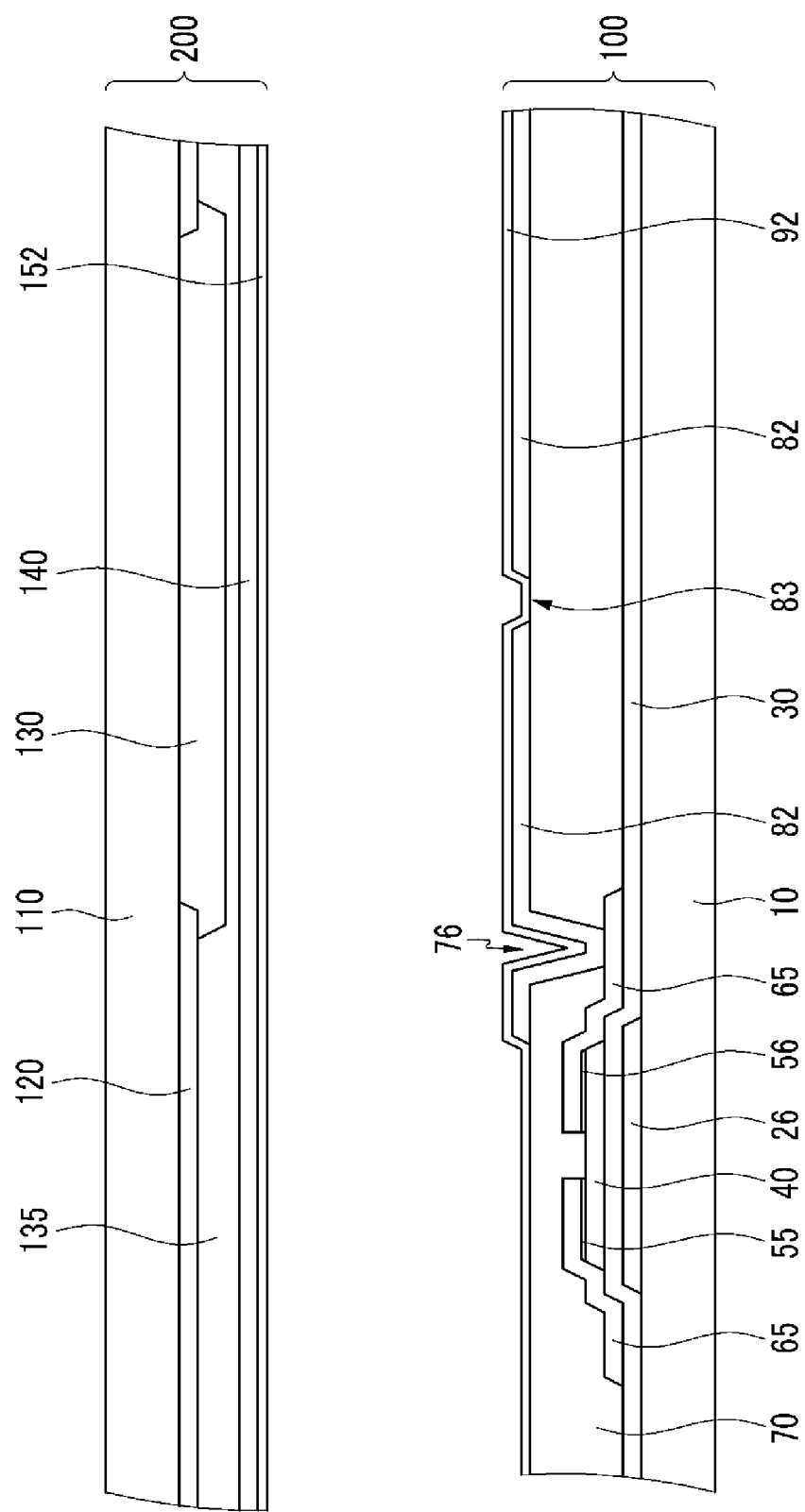

Subsequently, as shown in FIG. 4, the second display panel 200 is disposed to face the first display panel 100. The second display panel 200 includes a plurality of elements such as a common electrode 140 having a domain-forming member (not shown).

In particular, a black matrix 120 is disposed on an insulation substrate 110. In one exemplary embodiment, the black matrix 120 may be formed by depositing an opaque material such as chromium on the insulation substrate 110 and patterning the deposited opaque material. The black matrix 120 prevents light leakage and defines a pixel area.

Then, a color filter layer is formed on the black matrix 120 and a top surface of the insulation substrate 110, which is exposed by the black matrix 120. In one exemplary embodiment, a photosensitive resist may be coated to form the color filter layer. Red, green, and blue color filters 130 are formed by exposing and developing the color filter layer. Then, an overcoat layer 135 is formed on the black matrix 120 and the color filters 130.

A common electrode 140 is then formed on the overcoat layer 135. In one exemplary embodiment, the common electrode 140 may be formed by coating a conductive material on the overcoat layer 135.

Subsequently, the second vertical alignment layer 152 is formed on the common electrode 140. In one exemplary embodiment, the second vertical alignment layer 152 may be formed through printing.

Referring to FIG. 9, a column spacer 361 may be formed at the second display panel 200 to sustain a cell gap, which is a distance between the first display panel 100 and the second display panel 200. In one exemplary embodiment, the column spacer 361 has a black color so that it operates as a black matrix. In an alternative exemplary embodiment, the column spacer 361 may be formed at the first display panel instead of the second display panel 200. Referring to FIG. 10, the cell gap may be sustained by distributing bead spacers 363 at one of the two display panels 100 and 200 instead of, or in combination with, the column spacer 361. Referring to FIG. 9 and FIG. 10, a sealant 340 is coated at the circumference of the first display panel 100 or the second display panel 200 in order to seal the liquid crystal mixture 300 between the first and second display panels.

Referring to FIG. 5, a liquid crystal mixture 300 having liquid crystals and an alignment supplement is coated on one of the first and second display panels 100 and 200, in one exemplary embodiment they may be coated through a drip process, and the two display panels 100 and 200 are then bonded together. Alternative exemplary embodiments include configurations wherein, the first and second display panels 100 and 200 are bonded together, and the liquid crystal mixture 300 is then interposed between the first display panel 100 and the second display panel 200, in one exemplary embodiment the interposing may be done using an injection process. In one exemplary embodiment, the liquid crystal may have negative dielectric anisotropy, e.g., the liquid crystal may be nematic liquid crystal. The alignment supplement is a reactive monomer, and in one exemplary embodiment the alignment supplement is an ultraviolet curable monomer. In one exemplary embodiment, the liquid crystal mixture may further include an ultraviolet hardening initiator, e.g., the ultraviolet curable monomer may be an acrylate monomer. The ultraviolet curable monomer is made of a material that can be cured by light having a wavelength in an ultraviolet region of the electromagnetic spectrum. In one exemplary embodiment, the ultraviolet curable monomer may be 2,2-dimethoxy-1,2-diphenyl ethanone. The ultraviolet hardening initiator may be present in a range between about 0 wt % and about 0.05 wt % based on the liquid crystals, and the ultraviolet curable monomer may be present in a range between about 0 wt % and about 1 wt % based on the liquid crystals.

Subsequently, referring to FIG. 6, the alignment supplement as well as the sealant 340 are hardened after applying a pre-tilt voltage V to the first and second display panels 100 and 200. If the alignment supplement is the ultraviolet curable monomer, the ultraviolet rays are radiated for hardening the alignment supplement. In one exemplary embodiment, the pre-tilt voltage V may be applied through a visual test pad of the first and second display panels 100 and 200 or an additional voltage applying unit. The pre-tilt voltage V applied through an additional voltage applying unit will be described with reference to FIGS. 17-19.

Referring to FIG. 17, wiring lines 421, 423, 424, 425, 426, and 427 for applying a voltage and pads 431 to 433 connected thereto are formed on a first mother substrate 401 and a second mother substrate 402. Here, a plurality of first display panels 100 may be formed on the first mother substrate 401, and a plurality of second display panels 200 may be formed on the second mother substrate 402. The wiring lines 421, 423, 424, 425, 426, and 427 for applying a voltage and the pads 431 to 433 may be made of substantially the same material and manufactured through the same manufacturing method as the gate wires, the data wires, the pixel electrodes 82, or the common electrodes 140. In FIG. 17, each of reference numerals 411 to 416 denotes a region that becomes one of a plurality of LCDs, and reference numeral 403 denotes a mother substrate assembly including the first mother substrate 401, the second mother substrate 402, the liquid crystal mixture layer 300, and the sealant 340.

In FIG. 17, the wiring lines 421, 423, 424, 425, 426, and 427 may be formed at both the first and second mother substrates 401 and 402. Some of the wiring lines 421, 423, 424, 425, 426, and 427 may be formed at the first mother substrate 401, and the others may be formed at the second mother substrate 402. A voltage may be separately applied to the first and second mother substrates 401 and 402. Alternative exemplary embodiments include configurations wherein, the voltage may be applied to one of the first and second mother substrates 401 and 402, and the one receiving the voltage transfers the voltage to the other. In such an alternative exemplary embodiment, it is necessary to have a break point that connects the two mother substrates 401 and 402.

The two mother substrates 401 and 402 must be slightly unevenly overlapped in order to expose the pads 431 to 433. Accordingly, regions formed in the first and second mother substrates 401 and 402 must be formed to unevenly overlap each other.

As shown in FIG. 18, electrodes 441 to 443 of a probe 451 are connected to the pads 431 to 433, and an ultraviolet mask 530 is aligned with the mother substrate assembly 403. The ultraviolet mask 530 includes a sealant filter 521, a display area filter 522, and a black region 523. The sealant filter 521 transmits ultraviolet wavelength light. The sealant filter 521 transmits light having a wavelength of less than about 380 nm, and in one exemplary embodiment, the sealant filter 521 transmits a wavelength of less than about 365 nm. The display area filter 522 transmits light having a predetermined wavelength of ultraviolet rays, in one exemplary embodiment the display area filter 522 transmits light having a wavelength of about 365 nm, about 313 nm and about 303 nm. Alternative exemplary embodiments include configurations wherein the display area filter 522 transmits ultraviolet rays having a short wavelength, for example about 370 nm. Here, the black region 532 may be made of a transparent material or an opaque material, excluding the filter units 521 and 522 of the ultraviolet mask 530. Also, exemplary embodiments include configurations wherein the ultraviolet mask 530 may be similar to, slightly smaller than, or slightly larger than the mother substrate assembly 403 in size. In one exemplary embodiment, the ultraviolet mask 530 may be formed by forming two types of filters 521 and 522 inside a black mask after forming the black mask.

In one exemplary embodiment the mother substrate assembly 403 is separated from the ultraviolet mask 530 by about 20 cm to about 1 m. In one exemplary embodiment, the power of a lamp producing the ultraviolet rays is greater than 0.1 mW, and the ultraviolet rays are radiated for about one second. Under some circumstances, the power may be greater or smaller than 0.1 mW, and the radiation time thereof may be longer or shorter than one second, as would be apparent to one of ordinary skill in the art.

Figure 7A:
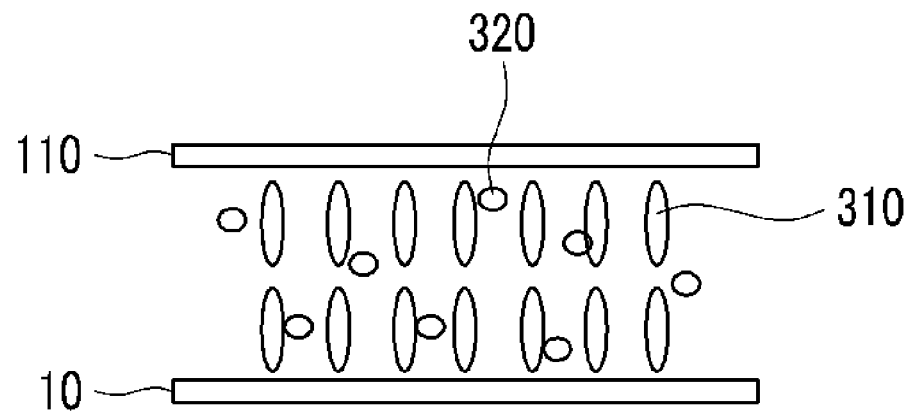
FIG. 7A is a cross-sectional view illustrating monomers of FIG. 6 and movements of liquid crystal molecules according to an applied voltage.
Figure 7B:
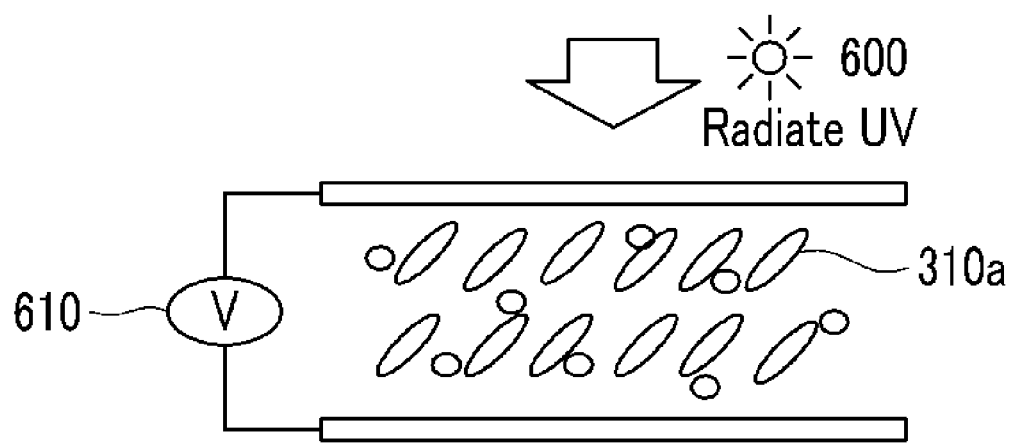
FIG. 7B is a cross-sectional view illustrating monomers of FIG. 6 and movements of liquid crystal molecules according to an applied voltage.

Referring to FIG. 7A and 7B, if ultraviolet rays 600 are radiated while applying a pre-tilt voltage 610, liquid crystal molecules become pre-tilted molecules 310a. Therefore, response speed is improved when an LCD is driven. Also, afterimages are reduced when an LCD displays a black screen in a normally black mode when power is not applied to the LCD.

In particular, it is determined that the response speed is improved and the afterimages are reduced because of the following reasons. When the ultraviolet rays 600 are radiated, hardening begins from ultraviolet curable monomers 321a and 321b that are adjacent to the first and second alignment layers 92 and 152. If the magnitude of the pre-tilt voltage 610 increases, the liquid crystal molecules 310 are tilted by an electric field that is induced according to the aperture of the pixel electrode 82. Accordingly, the ultraviolet curable monomers 321a and 321b are also tilted and hardened in an orientation similar to the liquid crystal molecules 310a. In one exemplary embodiment, the ultraviolet curable monomers adjacent to the first and second alignment layers 92 and 152 may be vertically hardened. In such an exemplary embodiment, the ultraviolet curable monomers may be tilted and hardened in an orientation similar to the liquid crystal molecules 310 as the ultraviolet curable monomers recede from the first and second alignment layers 92 and 152.

Since the liquid crystal molecules 310 can maintain the pre-tilt because of the ultraviolet curable monomers 321a and 321b even when no electric field is applied after completely manufacturing the LCD, the liquid crystal molecules 310 can be quickly tilted in a predetermined direction when the electric field is applied to the liquid crystal mixture layer 300. Therefore, response speed of the LCD is improved, and afterimages are reduced.

After performing the ultraviolet ray hardening process as described above, each of the LCDs is cut from the mother substrate assembly 403. Then, the manufacturing of each LCD is completed by disposing a backlight assembly having a lamp at a lower part of the liquid crystal panel. However, in another exemplary embodiment, the pixel electrode 82 of the first display panel 100 according to the present exemplary embodiment may be constituted as a plurality of miniature electrodes which form a plurality of miniature slits.

Hereinafter, an exemplary embodiment of a method of manufacturing an LCD according to another exemplary embodiment will be described with reference to FIGS. 11-19.

Figure 11:
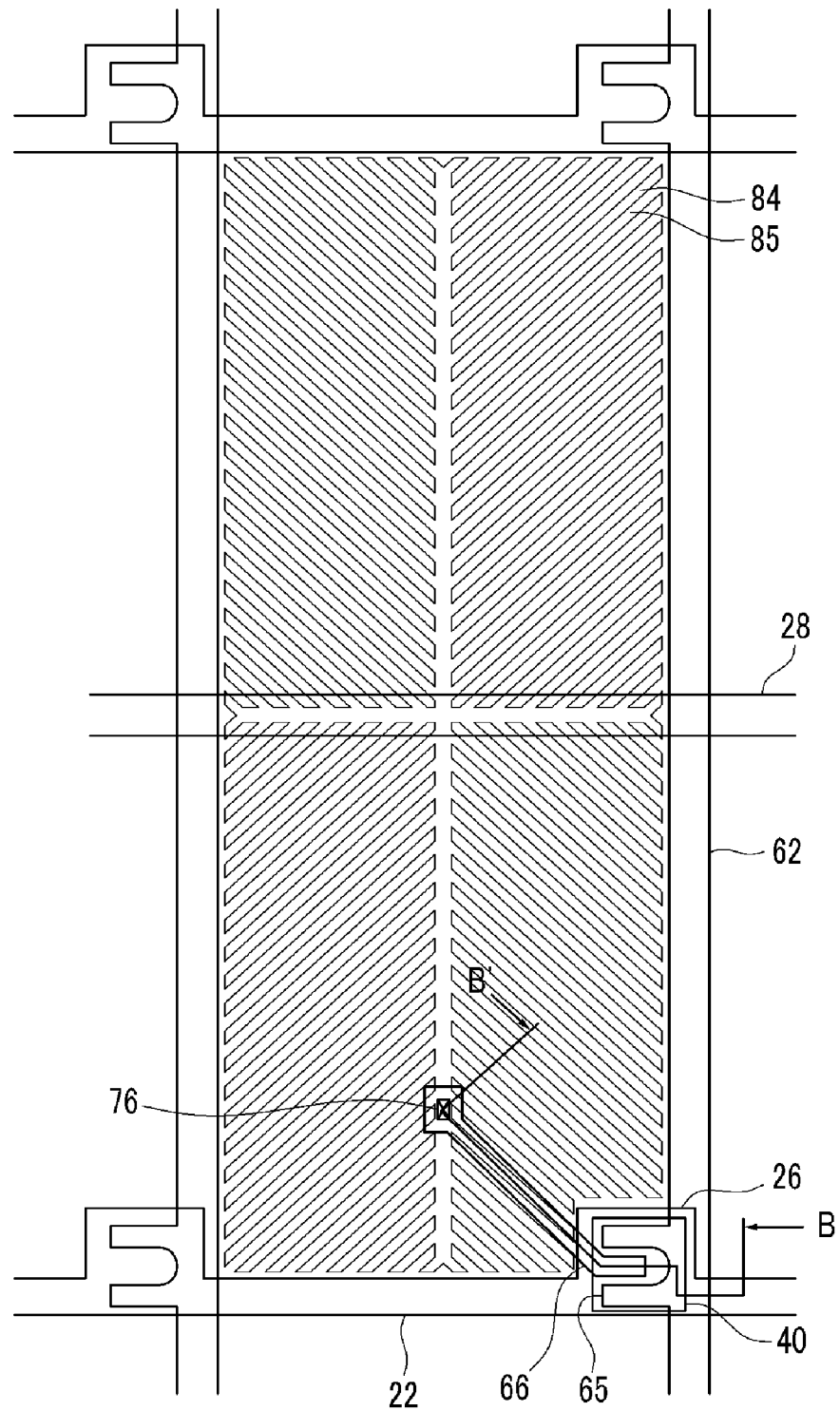
FIG. 11 is a top plan layout view of another exemplary embodiment of an LCD manufactured by an exemplary embodiment of a method of manufacturing an LCD according to the present invention.
Figure 12:
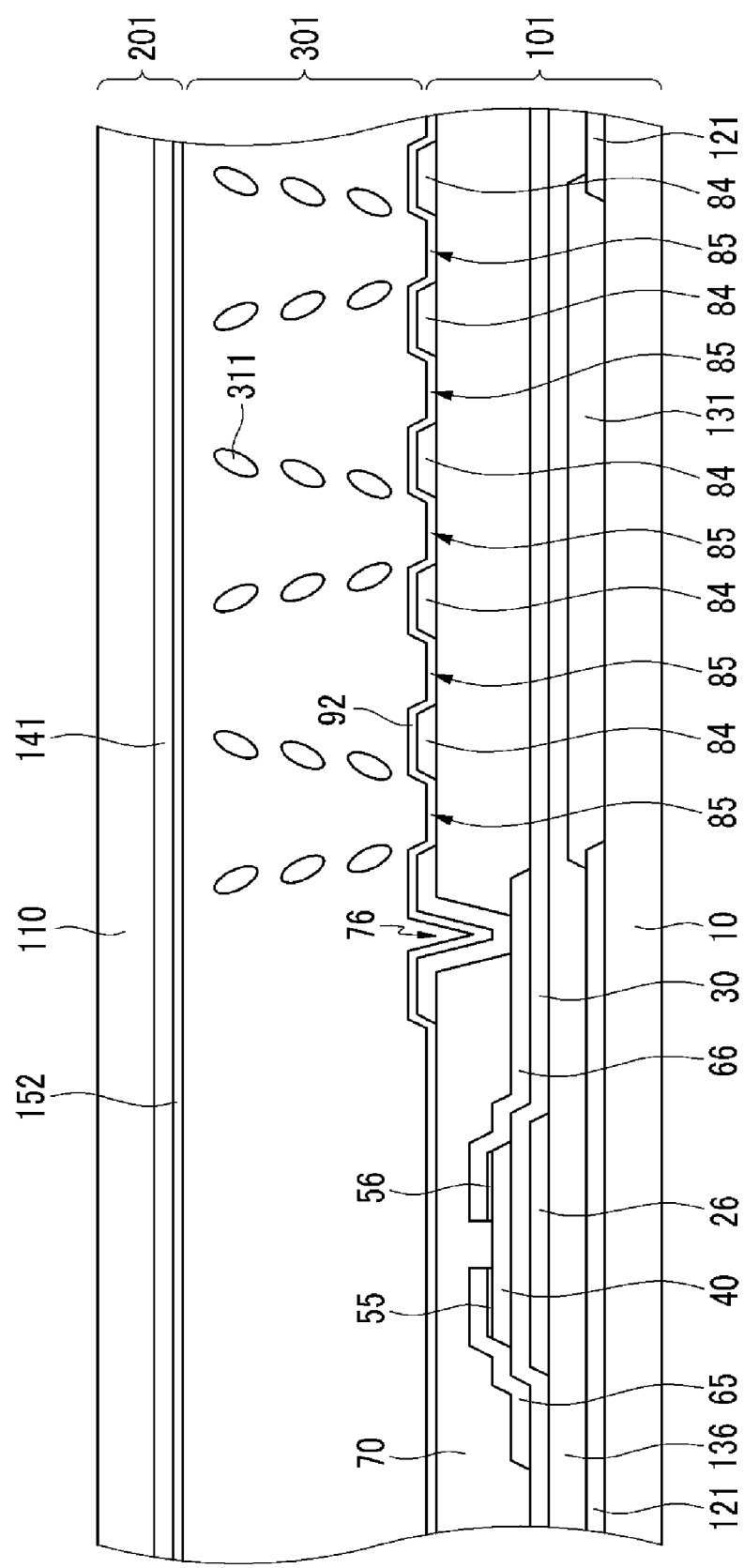
FIG. 12 is a cross-sectional view of the LCD of FIG. 11 taken along line B-B'.
Figure 13:
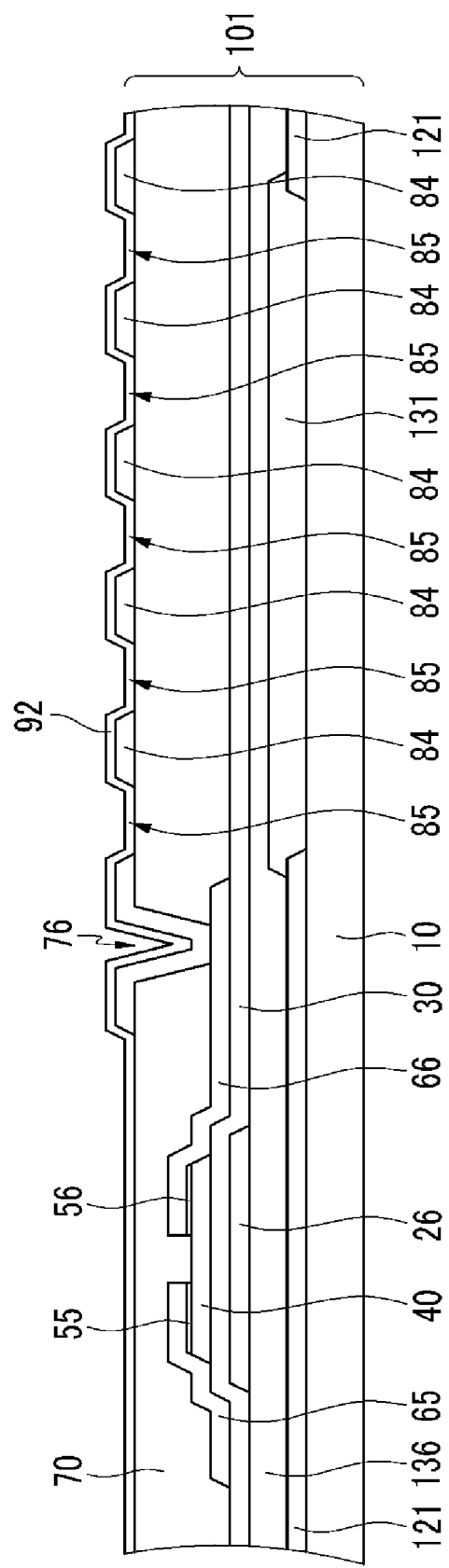
FIGS. 13-16 are cross-sectional views illustrating an exemplary embodiment of a method for manufacturing another exemplary embodiment of an LCD according to the present invention.

FIG. 11 is a top plan layout view of another exemplary embodiment of an LCD manufactured by an exemplary embodiment of a manufacturing method of an LCD according to the present invention. FIG. 12 is a cross-sectional view of an LCD of FIG. 11 taken along line B-B', and FIGS. 13-16 are cross-sectional views illustrating a manufacturing method of an LCD according to the current exemplary embodiment of the present invention.

Referring to FIG. 12, unlike the previous exemplary embodiment shown in FIGS. 1-6, in the current exemplary embodiment a color filter 131 and a pixel electrode 84 are formed on a first display panel 101. The LCD manufactured by the manufacturing method according to the present exemplary embodiment has an Array On Color filter ("AOC") structure or a Color filter On Array ("COA") structure. In the AOC structure, a thin film transistor array including a gate wiring is formed on the color filter 131. In the COA structure, the color filter 131 is formed on the thin film transistor array. Hereinafter, exemplary embodiments of the LCD will be described as having the AOC structure. Here, the location of sealant will be described with reference to FIG. 9 and FIG. 10.

Initially, the first display panel 101 having a black matrix 121, a color filter 131, and a plurality of miniature and interconnected electrodes 84 is prepared as shown in FIG. 11 and FIG. 12. The miniature electrodes 84 are disposed at regular intervals so as to form a plurality of miniature slits 85.

In particular, a black matrix 121 is formed by depositing an opaque material, exemplary embodiments of which include chromium, on the insulation substrate 10 and patterning the deposited opaque material. Subsequently, red, green, and blue color filters 131 are formed by coating a photosensitive resist on the black matrix 121 and a front surface of an insulation substrate 10, which is exposed by the black matrix 121, and exposing and developing the photosensitive resist. Then, an overcoat layer 136 is formed on the black matrix 121 and the color filters 131.

Thereafter, a gate wiring and a data wiring are formed on the overcoat layer 136 using substantially the same process as in the previous exemplary embodiment of a manufacturing method. The gate wiring includes a gate line 22, a gate electrode 26, and a storage electrode 28, and the data wiring includes a gate insulating layer 30, a semiconductor layer 40, a data line 62, a source electrode 65, and a drain electrode 66. Then, a passivation layer 70 having a contact hole 76 is formed on the result.

A conductive layer (not shown) for forming a pixel electrode is then formed on the passivation layer 70 and a pixel electrode formed of a plurality of miniature electrodes 84 is formed by patterning the conductive layer. In one exemplary embodiment, the conductive layer may be formed through sputtering. A main backbone structure is formed in a cross shape which divides the pixel electrode in four parts, and a plurality of miniature electrodes 84 extend in an oblique line direction from the main backbone structure by patterning the conductive material for a pixel electrode. Here, a plurality of miniature slits 85 is formed among the plurality of miniature electrodes 84. In such an exemplary embodiment, a plurality of miniature electrodes 84 have an angle of about 45° from a transmissive axis of a polarizer and extend from the main backbone structure in four directions. Exemplary embodiments include configurations wherein a width of one end of the miniature electrode 84, which is connected to the main backbone structure, may be identical to or different from a width of the other end. If the width of the miniature electrodes 84 is uniform, the width of the miniature electrodes 84 may be identical to or different from the width of the miniature slits 85. In one exemplary embodiment, the width may be narrower than about 5 μm. In one exemplary embodiment, a width of one end of the miniature electrodes 84, which are connected to the main backbone structure, may be wider than a width of the other end thereof.

A first vertical alignment layer 92 is formed above the pixel electrode to complete formation of the first display panel 101.

Figure 14:
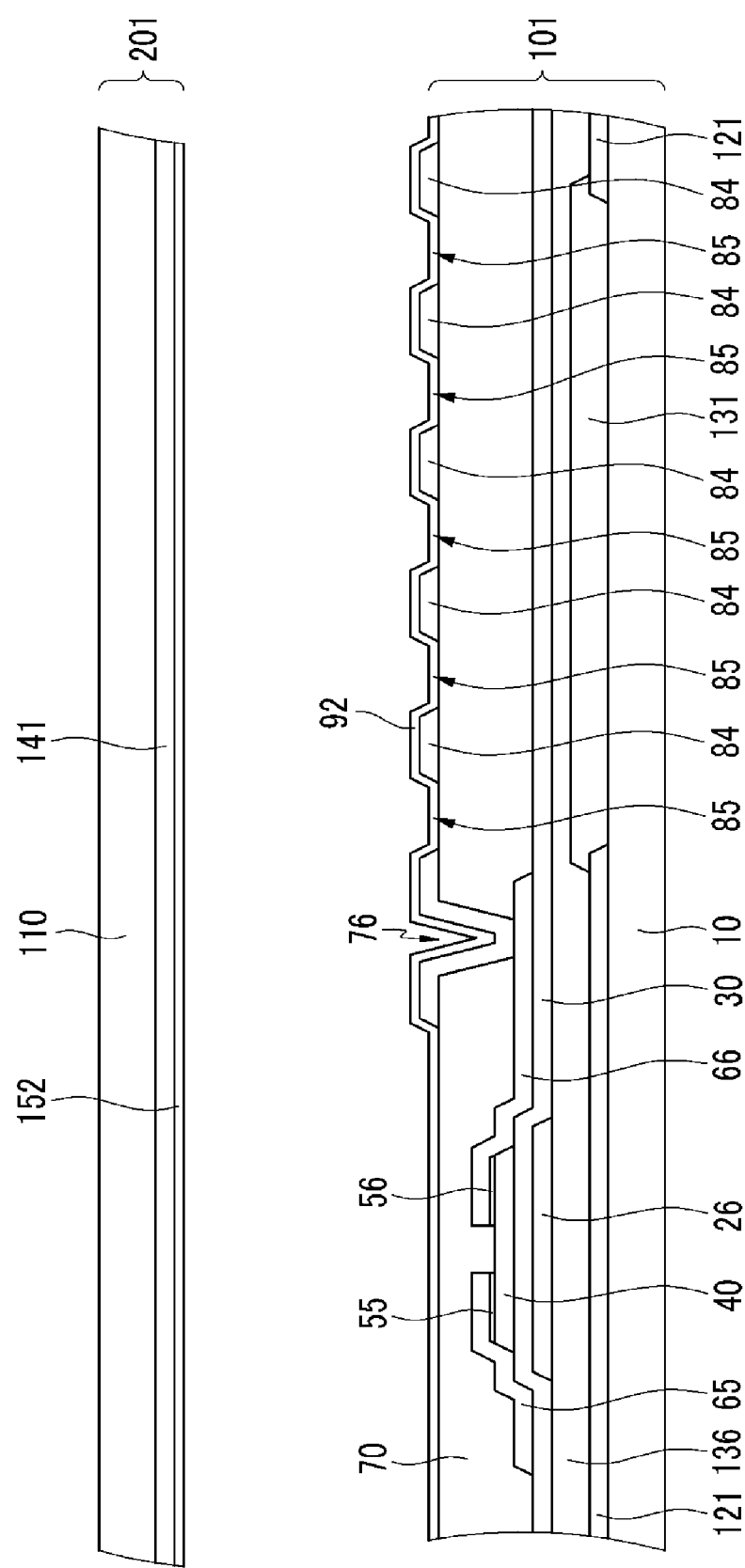

Referring to FIG. 14, a second display panel 201 having a common electrode 141 is provided to face the first display panel 101. In particular, a conductive material for a common electrode is deposited on an insulation substrate 10. In one exemplary embodiment, the conductive material may be formed through sputtering. Exemplary embodiments of the conductive material may be made of ITO. Since the common electrode according to the present exemplary embodiment is not patterned, the deposited conductive material for the common electrode may be used as the common electrode 141. Since the conductive material for the common electrode is not patterned in the present exemplary embodiment, the manufacturing process time may be shortened. Also, the defect rate of the LCD may be reduced because there is no error alignment problem between domains of the first and second display panels 101 and 201.

Then, a second vertical alignment layer 152 is formed on the common electrode 141. In one exemplary embodiment, the second vertical alignment layer 152 may be formed through printing. The disposition of the second vertical alignment layer 152 completes the formation of the second display panel 201.

Figure 15:
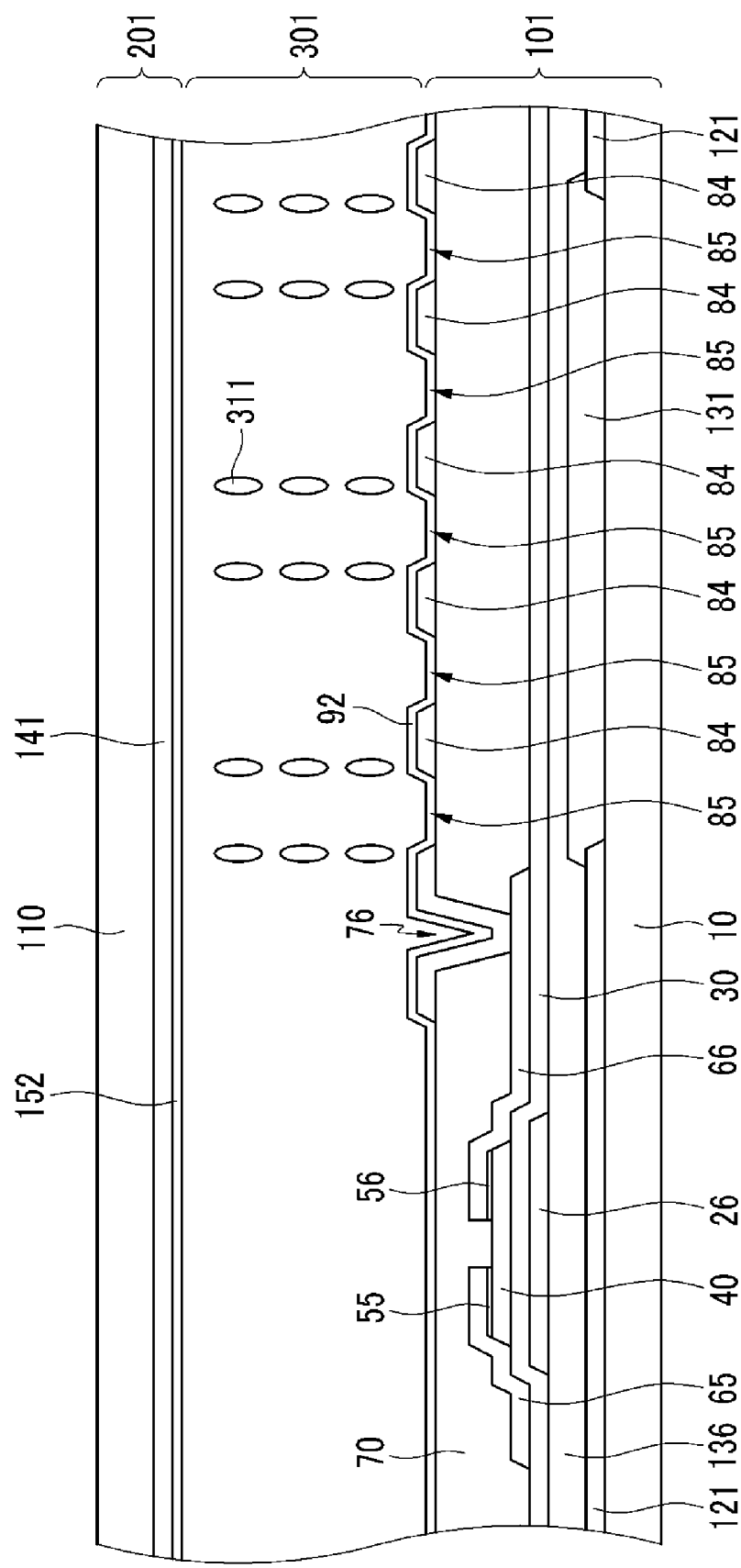

Referring to FIG. 15, in one exemplary embodiment a spacer and a sealant are formed on one of the two display panels 101 and 201, the two display panels 101 and 201 are bonded together, and a liquid crystal mixture is injected therebetween in a vacuum state. Alternative exemplary embodiments include configurations wherein, a liquid crystal mixture is dripped on one of the two display panels 101 and 201, and the two display panels 101 and 201 are bonded together. The liquid crystal mixture includes liquid crystal and an alignment supplement. The alignment supplement may include an ultraviolet curable monomer as described above. The liquid crystal mixture may further include an ultraviolet hardening initiator. Also, the liquid crystal mixture may include a dopant for controlling a pitch of the liquid crystal. Here, the dopant may be a chiral dopant, and improves a response speed of the LCD by shortening a pitch of a liquid crystal. In FIG. 15, reference numeral 311 denotes a liquid crystal molecule, and reference numeral 301 denotes a liquid crystal mixture layer.

Figure 16:
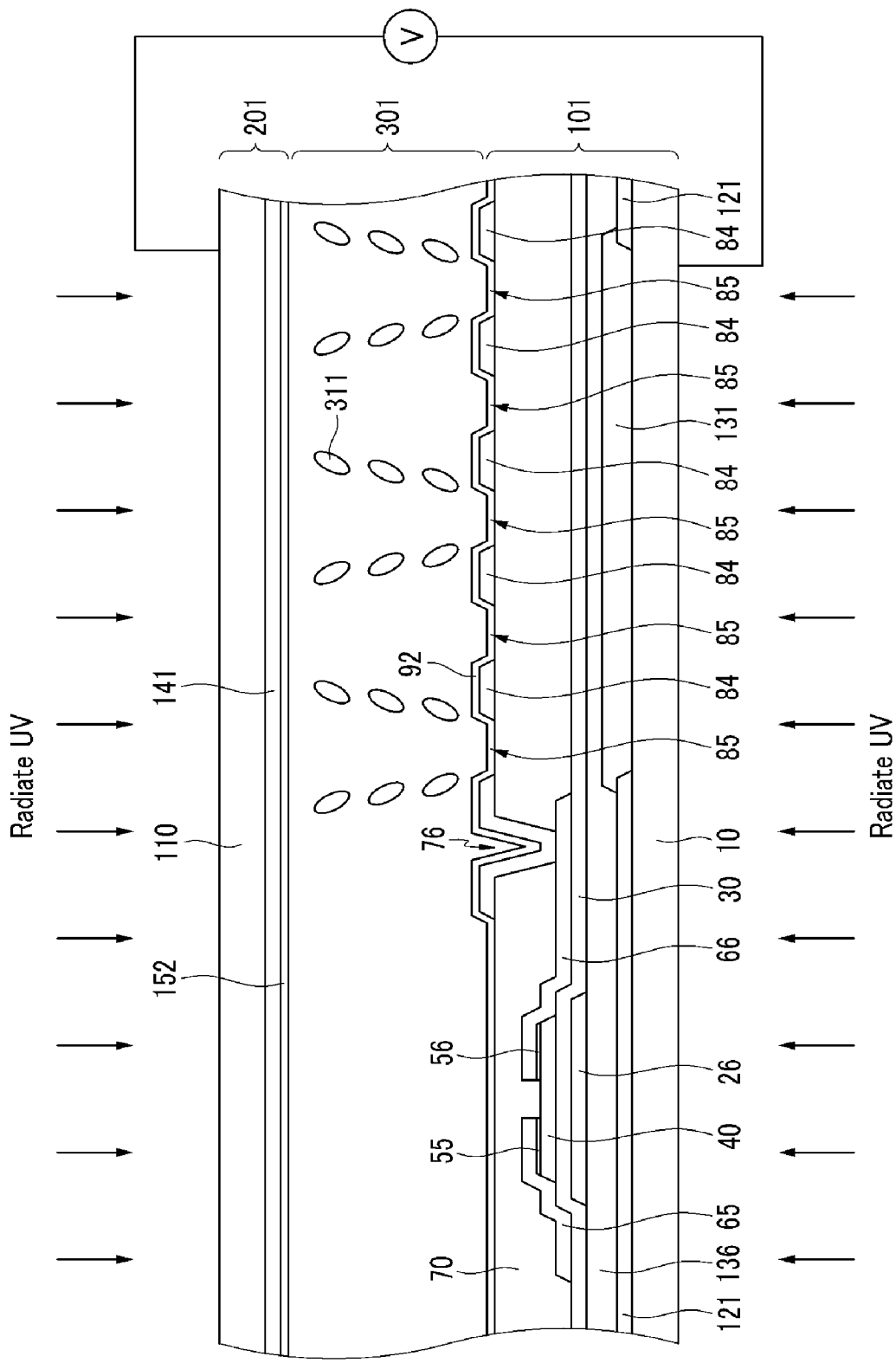

Referring to FIG. 16, a pre-tilt voltage V is applied to the first and second display panels 101 and 201. While applying the pre-tilt voltage V, ultraviolet rays are radiated to the display panel assembly having the first and second display panels 101 and 201 and the liquid crystal mixture layer 301. In one exemplary embodiment, an ultraviolet radiating process is performed immediately after injecting the liquid crystal mixture.

If the ultraviolet curable monomer is not hardened because the color filter 131 absorbs ultraviolet rays, afterimages may be generated. Therefore, the ultraviolet rays may be radiated toward the second display panel 201 from the upper part of the second display panel 201 in order to minimize the absorption of the ultraviolet rays by the color filter 131. However, the ultraviolet rays are radiated from both sides of the first and second display panels 101 and 102 according to the present exemplary embodiment.

If the ultraviolet rays are radiated to the LCD, the ultraviolet curable monomer and sealant are simultaneously hardened. Since an electric field is induced at the liquid crystal mixture layer 301 according to the miniature slits 85 of the pixel electrode when the voltage is applied to the first and second display panels 101 and 102, the liquid crystal molecules 311 are tilted, and accordingly the ultraviolet curable monomers are also tilted. If the ultraviolet rays are radiated, the tilted ultraviolet curable monomers are hardened. Therefore, the tilted state of the liquid crystal molecules 311 is fixed. Since the liquid crystal molecules 311 can maintain the pre-tilt because of the ultraviolet curable monomers even when no electric field is applied after completely manufacturing the LCD, the liquid crystal molecules 311 can be quickly tilted in a predetermined direction when the electric field is applied to the liquid crystal mixture layer 301. Therefore, response speed of the LCD is improved, and afterimages are reduced. Processes following those explicitly discussed herein may progress substantially identically to the previous exemplary embodiment.

As described above, the overall manufacturing processes can be reduced and manufacturing time can be shortened by simultaneously hardening a monomer for pre-tilt and a sealant through radiating ultraviolet rays.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, it should be understood that the above-described exemplary embodiments are only examples, and the present invention is not limited thereto.

What is claimed is:

1. A method of manufacturing a liquid crystal display, comprising:
    forming a mother substrate assembly by disposing a liquid crystal mixture layer having liquid crystals and a light curable alignment supplement between a first mother substrate and a second mother substrate of a liquid crystal display, and disposing a light curable sealant surrounding the liquid crystal mixture layer;
    pre-tilting liquid crystal molecules of the liquid crystal mixture layer by applying a voltage to the first mother substrate and the second mother substrate; and
    simultaneously hardening the light curable alignment supplement and the light curable sealant by radiating light to the mother substrate assembly while applying the voltage to the first mother substrate and the second mother substrate,
    wherein the radiating light to the mother substrate assembly includes the light curable sealant receiving the light having a wavelength in a first range, while the light curable alignment supplement receives the light having a different wavelength in a second range shorter than the first range.

2. The method of claim 1, wherein the light includes ultraviolet rays.

3. The method of claim 2, wherein the mother substrate assembly includes a plurality of liquid crystal display regions, and
    the mother substrate assembly further includes voltage-applying wiring which connects the liquid crystal display regions.

4. The method of claim 3, wherein the simultaneously hardening includes aligning the mother substrate assembly and an ultraviolet mask.

5. The method of claim 4, wherein the ultraviolet mask includes:
    a first filter which transmits ultraviolet rays having a wavelength of the first range and wherein the first filter is disposed corresponding to the light curable sealant; and
    a second filter which transmits ultraviolet rays having a wavelength of the second range and wherein the second filter corresponds to a display area surrounded by the light curable sealant.

6. The method of claim 5, wherein the second filter transmits ultraviolet rays having a wavelength of about 365 nm.

7. The method of claim 2, further comprising:
    disposing a thin film transistor on the first mother substrate; and
    disposing a color filter on or below the thin film transistor.

8. The method of claim 7, further comprising:
    disposing a pixel electrode on the first mother substrate;
    disposing a first alignment layer on the pixel electrode;
    disposing a common electrode on the second mother substrate; and
    disposing a second alignment layer on the common electrode.

9. The method of claim 2, wherein the alignment supplement includes an ultraviolet curable monomer.

10. The method of claim 9, wherein a content of the ultraviolet curable monomer in the alignment supplement is equal to or greater than about 0 weight % and smaller than about 1 weight % based on the liquid crystals.

11. The method of claim 1, wherein the pixel electrode includes a plurality of miniature electrodes that form a plurality of miniature slits.

12. A mask for ultraviolet rays, comprising:
    a first filter which transmits light having a wavelength of about 320 nm to about 380 nm;
    a second filter which surrounds the first filter and transmits light having a wavelength shorter than about 380 nm; and
    one of a transparent and opaque region disposed outside the first and second filters.

13. A method for manufacturing a mask for ultraviolet rays, comprising:
    forming a black mask;
    disposing a first filter inside the black mask for transmitting light having a wavelength of about 320 nm to about 380 nm; and
    disposing a second filter at the circumference of the first filter for transmitting light having a wavelength shorter than about 380 nm.

14. A method for manufacturing a liquid crystal display, comprising:
    forming a first mother substrate;
    disposing a second mother substrate facing the first mother substrate;
    disposing a liquid crystal mixture layer having liquid crystals and an alignment supplement between the first and second mother substrates
    surrounding the liquid crystal mixture layer with a sealant;

bonding the first and second mother substrates together using the sealant;

applying a pre-tilt voltage to the first and second mother substrates;

aligning a display panel assembly including the first and second mother substrates, the liquid crystal mixture layer, the sealant, and an ultraviolet mask having at least two types of ultraviolet filters each having a substantially different transmissive wavelength range; and simultaneously hardening the alignment supplement and the sealant by radiating ultraviolet rays through the ultraviolet mask.

15. The method of claim 14, wherein the mother substrate assembly includes a plurality of liquid crystal display regions, and the mother substrate assembly further includes voltage-applying wiring which connects the liquid crystal display regions.

16. The method of claim 15, wherein the bonding of the first and second mother substrates includes exposing a pad of the voltage-applying wiring via the alignment of the first and second mother substrates.

17. The method of claim 15, wherein the radiating of the ultraviolet rays includes separating the display panel assembly from the ultraviolet mask by about 20 cm to about 1 m.

18. The method of claim 15, wherein the ultraviolet mask is about the same size as the first and second mother substrates.

19. The method of claim 14, wherein the ultraviolet mask includes:
a first filter which transmits ultraviolet rays having a wavelength in a first range corresponding to the sealant; and
a second filter which transmits ultraviolet rays having a wavelength in a second range shorter than the transmission wavelength of the first filter and wherein the second filter corresponds to a display area surrounded by the sealant.

20. The method of claim 19, wherein the second filter transmits light having a wavelength of about 300 nm to about 380 nm.

21. The method of claim 20, wherein the first filter transmits light having a wavelength shorter than about 365 nm.

22. The method of claim 21, wherein the ultraviolet mask is disposed outside the first and second filters and further includes a region that is one of transparent, semitransparent and opaque.

\* \* \* \* \*